United States Patent [19]

Franke

[11] Patent Number: 5,577,358
[45] Date of Patent: Nov. 26, 1996

[54] SEPARATION WALL FOR DIVIDING A CABIN IN A PASSENGER AIRCRAFT

[75] Inventor: Lutz Franke, Hamburg, Germany

[73] Assignee: Daimler-Benz Aerospace Airbus GmbH, Hamburg, Germany

[21] Appl. No.: 544,711

[22] Filed: Oct. 18, 1995

[30] Foreign Application Priority Data

Oct. 18, 1994 [DE] Germany ............ 44 37 133.0

[51] Int. Cl.⁶ .................................... B64D 11/00
[52] U.S. Cl. .................. 52/238.1; 244/118.5
[58] Field of Search ............... 52/238.1; 244/118.5, 244/118.6, 120, 121, 122 AH, 129.1, 129.4, 129.5, 117 R, 119; 160/135

[56] References Cited

U.S. PATENT DOCUMENTS

| | | | |
|---|---|---|---|
| 4,375,876 | 3/1983 | Stewart | 244/129.5 |
| 4,597,549 | 7/1986 | Ryan | 244/118.5 |
| 4,899,962 | 2/1990 | Mueller | 244/129.2 |
| 5,165,626 | 11/1992 | Ringger et al. | 244/118.5 |
| 5,393,013 | 2/1995 | Schneider et al. | 244/118.5 |
| 5,482,230 | 1/1996 | Bird et al. | 244/121 |

FOREIGN PATENT DOCUMENTS

WO9301088   1/1993   WIPO .

*Primary Examiner*—Wynn E. Wood
*Assistant Examiner*—Aimee E. McTigue
*Attorney, Agent, or Firm*—W. G. Fasse; W. F. Fasse

[57] ABSTRACT

A separation wall for dividing a cabin space inside a passenger aircraft is constructed of two wall elements rigidly connected to each other in an overlap area. The transition between the overlap area and a respective wall portion of the corresponding wall element is formed by an off-set (27B, 28B; 31B, 32B). The off-sets may slant in the same direction or in opposite directions. The wall elements have lateral edges facing either an aisle in the aircraft cabin or an aircraft body wall. For this purpose the respective lateral edge tapers or curves upwardly to accommodate the aisle or the curvature of the body wall. The overlap area provides an improved strength and wall extensions (28D or 31D) form a space (19) for storage of items or mounting of equipment.

15 Claims, 3 Drawing Sheets

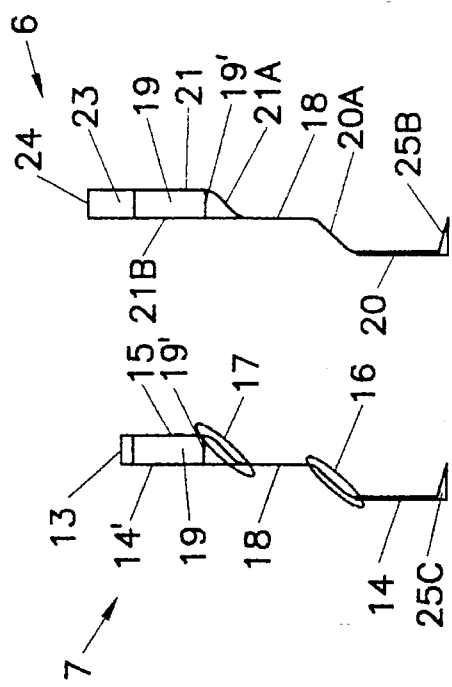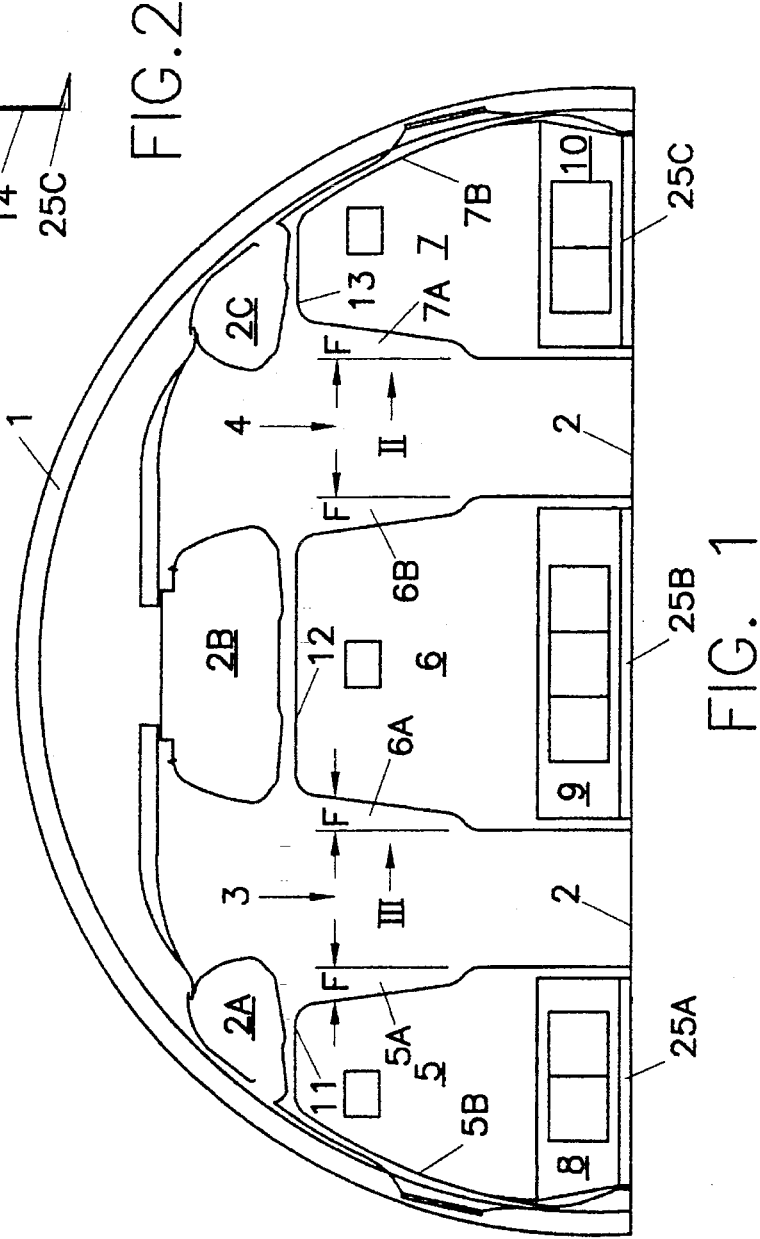

SEPARATION WALL FOR DIVIDING A CABIN IN A PASSENGER AIRCRAFT

FIELD OF THE INVENTION

The invention relates to separation walls for dividing a space into several sections. An aircraft cabin may be divided by such separation walls for example into a tourist section and a business section.

BACKGROUND INFORMATION

Separation walls of this type serve primarily for dividing the cabin space into different cabin sections to impede the view from one section to the other unless a person stands in an aisle. Such separation walls are made of relatively thin panel material, whereby the edges of the panels are trimmed to a desired profile.

International Patent Publication WO 93/01088 discloses such a separation wall which performs two functions, namely the separation function and a protective function in case of an accident to protect passengers sitting behind the separation wall against severe head injuries. The separation wall disclosed in the above mentioned International Publication comprises partial walls with a horizontal off-set. The laterally facing edges of the known separation wall are formed with a set-back relative to the footing of the wall section. The separation wall is secured to the floor of the cabin and to the cabin ceiling. In the installed condition the separation wall according to the above mentioned patent publication is inclined relative to the vertical in such a way that the backrest of a seat arranged in front of the separation wall can be fully inclined. The arrangement is such that the above mentioned second purpose, namely to protect passengers sitting behind the separation wall against head injuries is achieved. For this purpose the separation wall has individual wall portions which are movably interconnected, whereby the movable connection between the individual wall portions is so constructed that the connection absorbs, before it breaks, an excessive force effective on the separation wall and exceeding a rated force. Such a shock absorption minimizes an impact on a passenger. Due to the individual wall portions and their connection, the appearance of the separation walls is rather disturbing from an optical point of view, whereby the characteristic decor of the particular airline can hardly come to the fore.

If certain features that are interrelated with the cabin operation such as equipment, indicator and instruction panels, magazine storage space, and literature pockets and the like are to be integrated into such a conventional separation wall, one encounters problems due to the relatively small wall thickness of the conventional separation wall. Thus, additional steps are taken for the concealing or enclosing of the above mentioned equipment and items. The separation walls of the above described type thus require expensive measures for arranging the equipment or items to be housed or stored in these separation walls. Additionally, conventional separation walls make it difficult to blend the separation walls into the cabin decor. Nothing can be gleaned from the above mentioned disclosure with regard to the integration of equipment into the separation wall, especially where the above mentioned protective function is not required.

OBJECTS OF THE INVENTION

In view of the above it is the aim of the invention to achieve the following objects singly or in combination:

to construct a separation wall of the type described above in such a manner that the installation or storage of equipment and items inside the wall is easily possible;

to construct the wall in such a way that its simple, yet functional configuration is easily integrated into a cabin decor, for example, a color decor;

to simplify the production of the separation walls to assure an economical sequence of manufacturing steps for making the present separation walls;

to avoid an obstruction of the aisles in the aircraft cabin by the present separation walls;

to provide new possibilities of the seat arrangement next to a separation wall; and to strengthen the present separation wall in those areas of the wall where strength is needed while keeping the entire wall as lightweight as practically possible.

SUMMARY OF THE INVENTION

According to the invention a separation wall for a cabin in a passenger aircraft is characterized by a first wall element and a second wall element rigidly interconnected with each other in an overlap area of increased strength. The first wall element, which may be a lower wall element, has at least one horizontally extending first offset positioned approximately midway between upper and lower horizontal edges of the first wall element. The second wall element, which may be an upper wall element, also has at least one horizontally extending second off-set positioned approximately midway between upper and lower horizontal edges of the second wall element. Each of the first and second wall elements comprises an overlap area and these overlap areas are rigidly interconnected with each other, for example by an adhesive bonding, by a screw connection, by a riveted connection, and by any other connection suitable for the particular materials employed, such as high frequency welding or frictional welding or any other suitable connecting device. As a result of this overlapping connection, the first and second off-sets extend above and below the overlap area which provides a central reinforcement for the separation wall. The first and second wall elements have lateral edges, each with a respective set-back, whereby the set-backs increase upwardly to accommodate either an aisle or the set-back is curved to accommodate an aircraft body wall.

The above combination of features according to the invention has the advantage that equipment can be easily installed or stored inside the separation wall and that the manufacturing of the separation wall can utilize production advantages, such as mold shaping of panel material.

BRIEF DESCRIPTION OF THE DRAWINGS

In order that the invention may be clearly understood, it will now be described, by way of example, with reference to the accompanying drawings, wherein:

FIG. 1 is a view in the forward longitudinal aircraft direction into the upper portion of a passenger aircraft cabin showing three separation walls according to the invention;

FIG. 2 is a view in the direction of the arrow II in FIG. 1;

FIG. 3 is a view in the direction of the arrow III in FIG. 1;

Figures 4, 5:
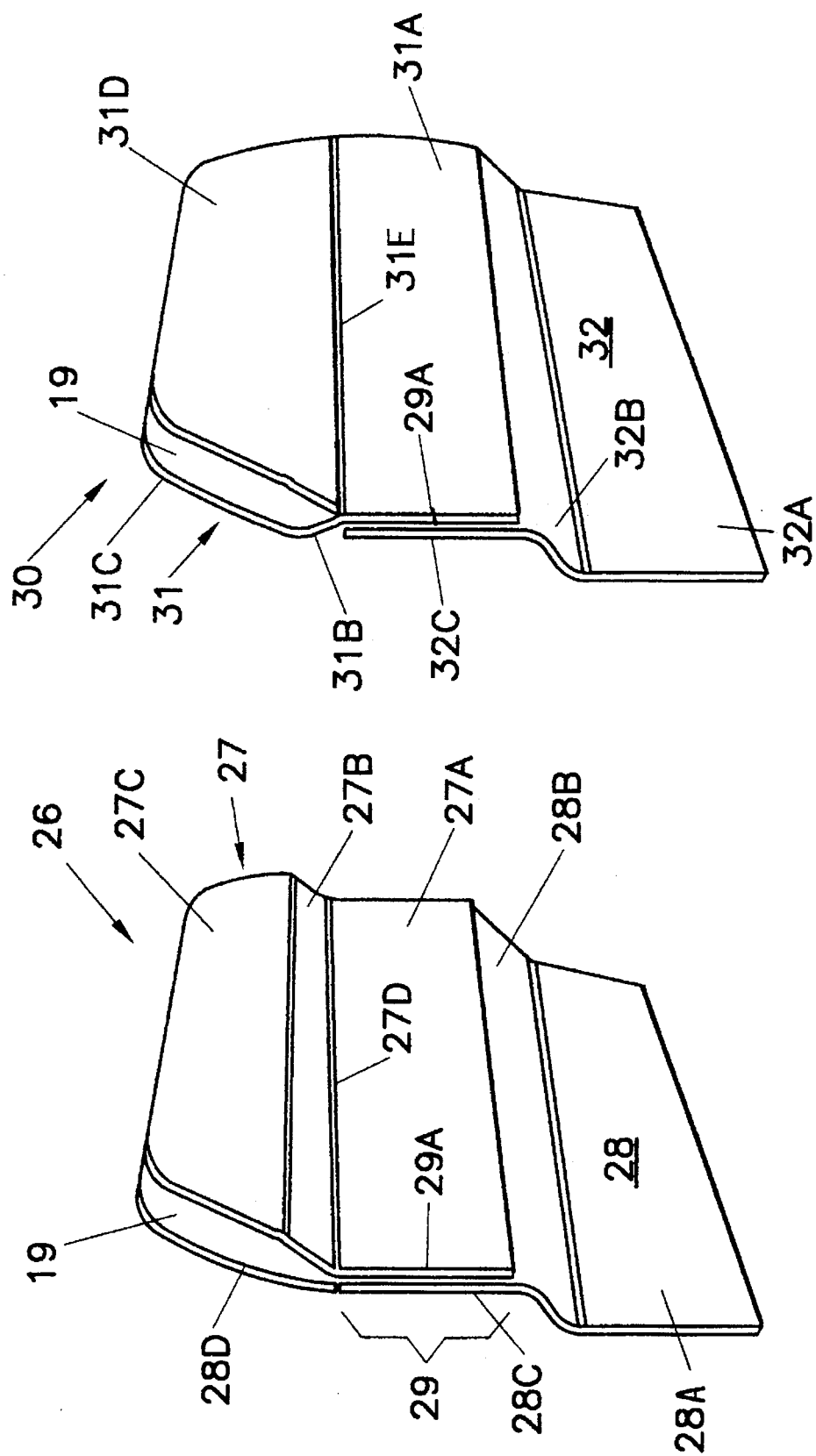
FIG. 4 is a perspective view of one embodiment of a separation wall according to the invention with two off-sets slanting in the same direction.
FIG. 5 is a perspective view similar to that of FIG. 4, but showing a modified embodiment with two off-sets each slanting in an opposite direction.

DETAILED DESCRIPTION OF PREFERRED EXAMPLE EMBODIMENTS AND OF THE BEST MODE OF THE INVENTION

The sectional view of FIG. 1 extends in the forward or flight direction, whereby the viewer faces the backs of three separation walls 5, 6, and 7 inside an aircraft cabin enclosed by an aircraft body 1 holding a cabin floor 2 and luggage compartments 2A, 2B, and 2C. The separation walls 5 and 6 are separated from each other by an aisle 3. The separation walls 6 and 7 are separated from each other by an aisle 4. Base sections 8, 9, and 10 of the separation walls 5, 6, and 7 respectively are connected to the floor 2 through footings 25A, 25B and 25C as will be described in more detail below with reference to FIG. 6. Each of the separation walls 5, 6, and 7 extends substantially vertically and reaches with its upper edge 11, 12 and 13 close to the respective luggage compartment 2A, 2B and 2C. The central separation wall 6 has the largest horizontal width in its base section 12 and that width is dictated by the width of the aisles 3 and 4.

Referring further to FIG. 1, aisle facing edges of the separation walls 5, 6 and 7 comprise in their upper regions so-called setbacks 5A, 6A, 6B and 7A. These set-backs taper upwardly with an increasing width F relative to the vertical. The central separation wall 6 has two such set-backs 6A and 6B and each of the separation walls 5 and 7 has just one of such set-backs 5A and 7A respectively, whereby the separation walls do not encumber the aisles 3 and 4. Additionally, the lateral separation walls 5 and 7 have a curved set-back 5B and 7B that accommodates the inner curvature of the body of the aircraft 1. All set-backs extend to the respective upper edge 11, 12 and 13. The two set-backs 6A and 6B are symmetrical and thus give the separation wall 6 a symmetrical configuration relative to a vertical central plane. The set-backs 5A and 5B and 7A and 7B provide the respective separation wall 5 and 7 with a non-symmetrical configuration. The aisle facing set-backs 5A and 7A are so constructed that they provide a sufficient over-view over the cabin space for a flight attendant standing in an aisle 3, 4. Different aisle arrangements may require different set-backs. The separation walls according to the invention, or rather their construction is easily adaptable to different aisle arrangements.

FIG. 2 shows a schematic side view of the separation wall 7 comprising two wall elements, namely a first, lower wall element 14 and a second, upper wall element 15. The lower wall element 14 has a first off-set 16. The upper wall element 15 has a second off-set 17. The two wall elements 14, 15 are interconnected in an overlapping area 18 in a rigid manner by the above mentioned possible connecting elements such as adhesive bonding or the like, whereby the overlap area strengthens the wall. Both set-backs 16 and 17 slant in the same direction so that the entire separation wall slants from left-to-right in FIG. 2 as seen by the viewer. As a result, the wall provides the effect of a slanted separation wall while the individual wall portions extend substantially vertically thereby avoiding the impression of a slanted wall. This feature provides new possibilities of seat arrangements next to the separation walls in the aircraft cabin.

An optical impression that the wall 7 appears slanted is avoided by the fact that large wall areas extend vertically as mentioned above. Further, the lower wall element 14 preferably has an upwardly extending wall portion or extension 14' which extends in parallel to an upper portion of the upper wall element 15, thereby providing a storage or installation space 19 between the upper wall portions. This space 19 is closed upwardly next to the upper edge 13. A floor 19' may be provided in the space 19 if desired to avoid a slanting floor provided by the upper off-set 17. Further, the footing 25C is secured to the floor.

FIG. 3 shows a view similar to that of FIG. 2, but illustrating the construction of the central separation wall 6. The separation wall 6 comprises a lower wall element 20 and an upper wall element 21 each provided with a respective off-set 20A and 21A. The two wall elements 20 and 21 are bonded to each other over an area 18 intermediate the two off-sets 20A and 21A so that the off-sets run horizontally along the upper and lower edges of the bonded overlapping area 18. A mounting space 19 is also formed which preferably has a rectangular cross-section by using a floor 19' and a top spacer 23 extending horizontally between the upper portion of the wall element 21 and a further wall element 21B which may either be an extension of the lower wall element 20 or a portion of the upper wall element 21 joined to the upper wall element 21 through the off-set 21A and the floor portion 19'. The footing 25B secures the wall section to the floor as mentioned.

Manufacturing advantages and strength advantages are achieved by the invention in that all separation walls 5, 6, 7 are constructed of two wall elements, each of which can be molded in a mold smaller than a mold that would be needed for the entire wall section. Further, and more important, the storage or mounting space 19 can easily be formed by a wall portion that is either an extension of the first or lower wall element or a separate wall element that can also be bonded to the other two wall elements in the overlapping area 18. If no space 19 is required, the lower wall element ends near the lower horizontal edge of the upper off-set 17 or 21A. It is also advantageous to make the off-set 16 identical to the off-set 17 and similarly the off-set 20A identical to the off-set 21A, whereby only minor mold changes are necessary. Another advantage is achieved if both wall elements have the same wall thickness which can be rather thin because a strengthening or stiffening is provided in the overlap area 18. Keeping wall elements in stock is also facilitated when the wall thicknesses are the same for both wall elements.

FIG. 4 shows a perspective illustration of a separation wall 26 according to the invention having a lower wall element 28 and an upper wall element 27 with an overlap connecting area 29. The lower wall element 28 comprises a first wall portion 28A, an off-set 28B, a second wall portion 28C, and an upward wall extension 28D. The off-set 28B interconnects the two wall portions 28A and 28C. The upper wall element 27 comprises three portions, namely a first portion 27A, an off-set 27B and a second portion 27C connected to the first portion through the off-set 27B. The wall portions 27A and 28C are interconnected by an adhesive 29A in the overlapping area 29. The off-sets 28B and 27B in FIG. 4 slant in the same direction, thereby achieving a wall configuration as shown in FIGS. 2 and 3. A storage or mounting space 19 is also formed in FIG. 4 between an upward extension 28D of the lower wall element 28 and the wall portion 27C of the upper wall element 27. The space 19 is upwardly open. The extension 28D may be a separate portion or it may be integrally connected to the wall section 28C. If desired, the extension 28D may also be connected to the upper wall element 27, for example along the lower edge 27D of the off-set 27B by any suitable connectors such as an adhesive bonding. The transition areas or edges between the off-sets 28B and 27B and the respective wall portions are preferably curved or rounded to provide for a smooth transition.

FIG. 5 shows a modified embodiment of a separation wall 30 having an upper wall element 31 and a lower wall element 32. The upper wall element comprises a first portion 31A, an off-set 31B, and a second portion 31C connected to the first portion 31A through the off-set 31B. The lower wall element 32 comprises a first portion 32A, an off-set 32B, and a second portion 32C connected to the first portion 32A through the off-set 32B. The wall portions 31A and 32C are bonded to each other by an adhesive as described. The off-set 32B extends in one direction while the off-set 31B extends in the opposite direction thereby forming a trough in the overlapping area of the wall portion 31A and 32C. In FIG. 5 the upper wall element 31 has an extension 31D that is integrally connected to the first portion 31A along a seam 31E preferably where the off-set 31B begins. Thus, a storage mounting space 19 is also formed in this embodiment.

Figure 6:
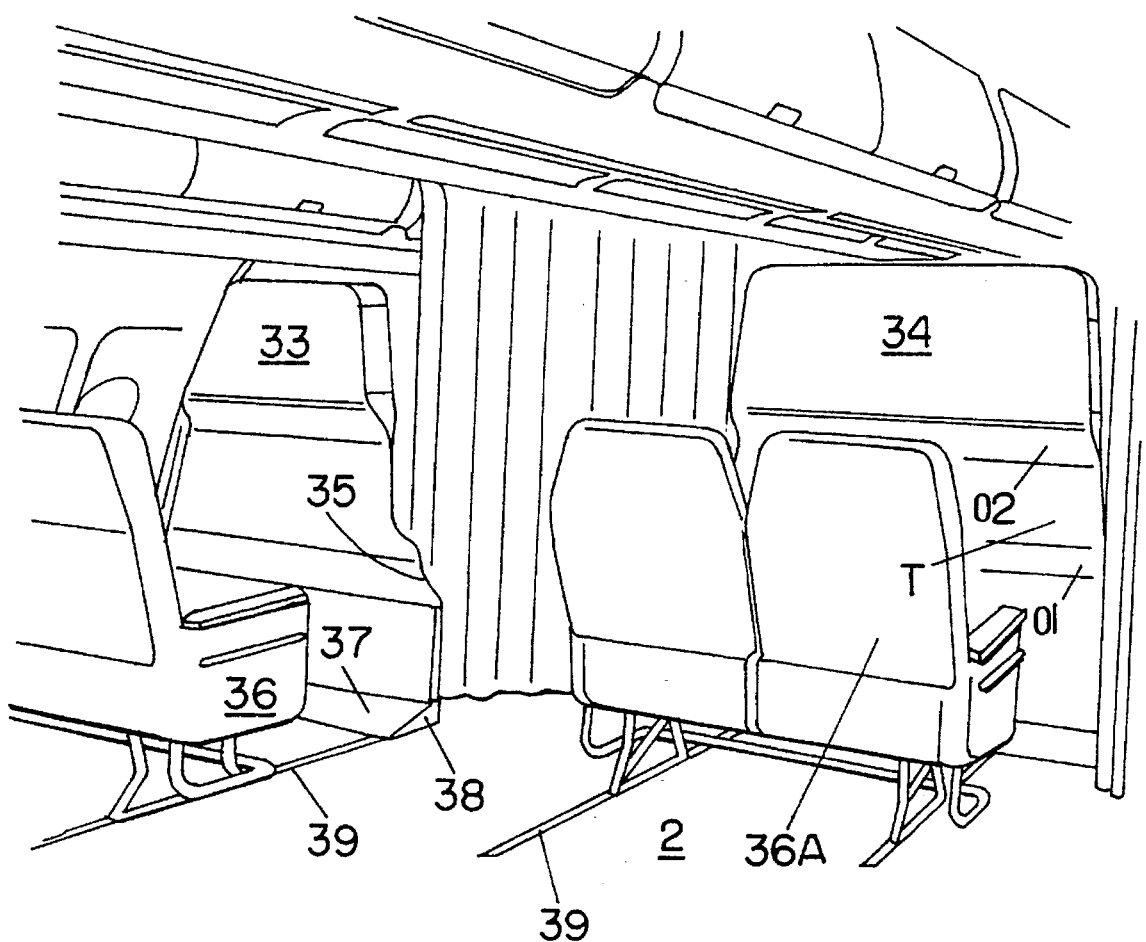
FIG. 6 is a perspective view into a portion of an aircraft cabin illustrating the arrangement of the present separation walls relative to respective seats.

The perspective view of FIG. 6 illustrates the arrangement of two separation walls 33 and 34. Due to the backward slant of the off-set 35, more leg room 37 is provided in front of the seats 36 above the footing 38 with which the wall 33 is bolted to the floor rails 39 in the floor 2 of the cabin. The footing 38 may simultaneously form a foot rest for a person sitting on the seat 36. The separation wall 34 has two off-sets O1 and O2 slanting in opposite directions thereby providing a trough T that yield more space for a food tray for passengers in seats 36A.

Although the invention has been described with reference to specific example embodiments, it will be appreciated that it is intended to cover all modifications and equivalents within the scope of the appended claims.

What is claimed is:

1. A separation wall for a cabin in a passenger aircraft, comprising a first wall element having at least one horizontally extending first off-set positioned approximately midway between upper and lower horizontal edges of said first wall element, a second wall element having at least one horizontally extending second off-set positioned approximately midway between upper and lower horizontal edges of said second wall element, each of said first and second wall elements comprising an overlap area, and means connecting said overlap areas to each other so that said first and second off-sets extend above and below said overlap area, said first and second wall elements having lateral edges each with a set back, said set-back increasing upwardly.

2. The separation wall of claim 1, wherein said first off-set and said second off-set slant in the same direction.

3. The separation wall of claim 1, wherein said first off-set slants in one direction and wherein said second off-set slants in an opposite direction.

4. The separation wall of claim 1, wherein said first off-set and said second off-set have the same identical geometrical configuration with rounded transitions between said off-set and the respective wall element.

5. The separation wall of claim 1, wherein said first wall element is a lower wall section, wherein said second wall element is an upper wall section, and wherein said lower wall section has an upwardly reaching extension (28D) extending spaced from said upper wall section to form a space (19) between said extension (28D) and a portion (27C) of said upper wall section.

6. The separation wall of claim 5, wherein said extension (28D) and said portion of said upper wall section each have an upper edge positioned substantially at the same horizontal level.

7. The separation wall of claim 5, wherein said first wall element and said second wall element have the same wall thickness, whereby a double thickness is provided in said overlap area.

8. The separation wall of claim 1, wherein said first wall element is a lower wall section (32), wherein said second wall element is an upper wall section (31), and wherein said upper wall section has a lower wall portion (31A), a first upper wall portion (31C), said second off-set (31B) interconnecting said lower wall portion (31A) and said first upper wall portion (31C), and a second upper wall portion (31D) connected to said upper wall section (31) so that said first upper wall portion (31C) extends with a spacing from said second upper wall portion (31D) thereby providing a space (19) between said first and second upper wall portions (31C and 31D).

9. The separation wall of claim 8, wherein said first and second upper wall portions extend in parallel to each other.

10. The separation wall of claim 8, wherein said second upper wall portion (31D) is connected to said lower wall portion (31A) where said lower wall portion (31A) merges into said second off-set (31B), said second off-set (31B) having a slant direction opposite to a slant direction of said first off-set (32B).

11. The separation wall of claim 8, wherein said first off-set (32B) and said second off-set are slanting in opposite directions (FIG. 5).

12. The separation wall of claim 8, wherein said upper wall section (31) is turned by 180° so that said first and second off-sets (32B, 31B) slant in the same direction (FIG. 4).

13. The separation wall of claim 1, wherein said set-backs (F) are mirror-symmetrical to each other in said separation wall between two aisles.

14. The separation wall of claim 1, wherein said set-backs of said separation wall near an aircraft body comprise a first set-back facing an aisle and a second set-back facing said aircraft body, said first set-back increasing upwardly, said second set-back having a curvature corresponding to a body curvature of said aircraft body.

15. The separation wall of claim 1, further comprising a base for connection to a floor in said aircraft.

\* \* \* \* \*